United States Patent
Chang

(10) Patent No.: US 8,408,242 B2
(45) Date of Patent: Apr. 2, 2013

(54) OVERFLOW SHUTOFF VALVE

(76) Inventor: Edward S Chang, Diamond Bar, CA (US)

( * ) Notice: Subject to any disclaimer, the term of this patent is extended or adjusted under 35 U.S.C. 154(b) by 721 days.

(21) Appl. No.: 12/365,441

(22) Filed: Feb. 4, 2009

(65) Prior Publication Data
US 2010/0193048 A1 Aug. 5, 2010

(51) Int. Cl.
*F16K 31/12* (2006.01)
(52) U.S. Cl. .......... 137/498; 137/502; 137/504
(58) Field of Classification Search .......... 137/497, 137/498, 502, 504, 499, 500, 501, 503
See application file for complete search history.

(56) References Cited

U.S. PATENT DOCUMENTS

| | | | |
|---|---|---|---|
| 4,825,897 A | 5/1989 | Shade | |
| 4,842,198 A | 6/1989 | Chang | |
| 4,867,603 A | 9/1989 | Chang | |
| 5,280,806 A | 1/1994 | Glazebrook | |
| 5,433,243 A * | 7/1995 | Griswold et al. | 137/498 |
| 5,613,518 A | 3/1997 | Rakieski | |
| 6,109,261 A * | 8/2000 | Clarke et al. | 128/203.15 |
| 6,363,963 B1 | 4/2002 | White | |
| 6,644,345 B2 | 11/2003 | Dulin | |
| 6,962,165 B2 | 11/2005 | Delprat et al. | |
| 7,111,638 B2 | 9/2006 | Johnson | |
| 2007/0034712 A1 | 2/2007 | Kah, Jr. | |
| 2007/0125436 A1 * | 6/2007 | Rich et al. | 138/26 |

* cited by examiner

*Primary Examiner* — John K Fristoe, Jr.
*Assistant Examiner* — Ian Paquette
(74) *Attorney, Agent, or Firm* — Kirk A. Buhler; Buhler & Associates

(57) ABSTRACT

Improvements in an Overflow Shutoff Valve (OSV) that is designed to automatically shutoff water flow when water flows above a rated amount. It is a self-cleaning design with automatic resetting function. The valve consists of an outer body with an inlet and outlet port with an internally installed rubber Venturi tube assembly, fixed flange, moving flange, coil spring and surge flow suppressing orifice. The lower pressure causes the rubber tube to be squeezed by the water pressure, and then automatically shuts off the valve. When the supply water pressure drops below 5 psi the Overflow Shutoff Valve automatically resets and opens to normal position. A flow suppressor orifice prevents any surge flow or start up flow which could cause premature shutoff of the valve. The Overflow shutoff valve can be installed in-line or in a Y body shutoff valve for easy service.

18 Claims, 4 Drawing Sheets

OVERFLOW SHUTOFF VALVE

CROSS REFERENCE TO RELATED APPLICATION

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates to improvements in water flow system and, more particularly, to irrigation watering sprinkler systems. The flow control device automatically shuts off the flow of water through the device when the flow exceeds a predetermined rate i.e. 120% or more of rated flow.

2. Description of Related Art Including Information Disclosed Under 37 CFR 1.97 and 1.98

The automatic sprinkler system is most common and widely accepted to irrigate agriculture and landscape of Local Parks, golf courses and residential households. The various types and sizes of sprinklers use billions of gallons of water every day. In the past years many people have invented excess water shutoff valve in order to prevent wasting water that is caused by a broken pipe or broken sprinkler system and head. There are numerous U.S. Patents granted for valve that limit excess flow or shutoff undesired flow. Exemplary examples of patents covering these products are disclosed herein.

U.S. Pat. No. 4,825,897 issued May 2, 1989 to Stephen A. Shade and U.S. Pat. No. 5,280,806 issued Jan. 25, 1994 to Richard J. Glazebrook discloses a Flow Control Device that uses a weighted spherical ball that is positioned in the housing which seats during subnormal fluid flow. When excessive flow occurs the ball is pushed up into pipe orifice that shuts off the flow to the irrigation head. While this patent discloses a flow control device the flow control device does not utilize a malleable elastomeric flow restricting device that collapses upon excessive flow.

U.S. Pat. No. 4,842,198 issued Jun. 27, 1989 and U.S. Pat. No. 4,867,603 issued Sep. 19, 1989 both issued to Shih-Chih Chang and U.S. Pat. No. 6,644,345 issued Nov. 11, 2003 to Robert Dullin describes a Device for Damage Protection against Local Flooding Caused by Sprinkler Failure. These devices uses a spring loaded valve which interrupts sprinkler flow when abnormal flow overpowers the spring and pushes the valve closed. While this device prevents excess flow the construction of the device does not use a malleable elastomeric collapsing structure when there is excessive flow.

U.S. Pat. No. 5,613,518 issued Mar. 25, 1997 to Kenneth E. Rakieski and U.S. Pat. No. 7,111,638 issued Sep. 26, 2006 to Dwight N. Johnson discloses an Excessive Flow Shutoff Devices that use a spring loaded plunger to shutoff excessive flow. This pending application eliminates the need for a spring by using a malleable elastomeric device that collapses when excessive flow pulls the sides of the shutoff device in to stop flow.

U.S. Pat. No. 6,363,963 issued Apr. 2, 2002 to William C. White discloses an Excess Flow Shutoff Valve. This patent discloses a flow sensitive piston that is pushed up and closes when there is excess flow through the conduit. This patent also does not disclose a malleable elastomeric collapsing device and requires a fairly complicated set of high precision components to shutoff excessive flow.

U.S. Pat. No. 6,962,165 issued Nov. 8, 2005 to Cyrille Delprat et al., discloses an Automatically-Actuated Safety Device with a Double-Seated Valve to Regulate the Flow Rate of a fluid. The flow device disclosed in this patent regulates the flow by partially deforming a plunger type device that spreads under high flow to reduce the amount of flow through the valve. This device does not stop excessive flow.

U.S. Published Application No. US 2007/0034712 published on Feb. 15, 2007 to Carl L. C. Kah Jr., discloses a Broken Sprinkler Flow Restriction or Flow Shutoff Suppressor for Sprinkler. The flow shutoff device is mounted directly under a sprinkler valve to stop flow using a spring loaded when a sprinkler is broken. This device does not collapse the flow line but uses a poppet valve to stop the flow.

What is needed is a device that is simple in construction and has a highly functionally reliable with desirable operating characteristics. The Overflow Shutoff Valve is designed to withstand surge flow of the system and this feature is not found in the cited reference patents.

BRIEF SUMMARY OF THE INVENTION

It is an object of the Overflow Shutoff Valve (OSV) to provide a simple reliable over flow shutoff valve which will automatically cut off the over flow of water above a preset flow rate in most water systems. The working fluid over flow above a preset flow rate through the rubber Venturi tube assembly will creates enough low pressure inside of the tube that it caused the tube to be drawn in where it will squeeze and shutoff the water flow.

It is an object of the Overflow Shutoff Valve to eliminate premature closure from surge flow by using a suppressor orifice that prevents any surge flow caused by line pressure changes or start up when the main valve opens or flow through the main valve receives or makes an abrupt pressure change.

It is another objective of the Overflow Shutoff Valve that device can withstand harsh environments. The unit is highly reliable because the OSV has a relatively simple design with a single, free moving part that opens the conduit with no direct act against another part. The valve is designed with a self cleaning function for soiled or allege grown water.

It is another object of the Overflow Shutoff Valve to automatically reset itself when back pressure drops. This eliminates the need for an operator to manually service the valve. Subsequent overflows will again shutoff the valve and when the water pressure stops of significantly reduces the OSV will again reset. The OSV works in a wide range of inlet pressures and is able to accurately function during inlet pressure fluctuation or surge. This valve wills shutoff only by the rate of flow changes.

It is another object of the Overflow Shutoff Valve to utilize a rubber Venturi tube material has been selected because it is one of the most resilient latex rubbers with high strength, high elongation rate and will spring back to original shape numerous instances. This gives the valve a long, lasting lifetime of usefulness and functionality. The OSV requires virtually little to no maintenance.

It is still another object of the Overflow Shutoff Valve that it can be installed vertically, horizontally, upside down position, and under or above ground. This allows the OSV to be installed in a horizontal, angled or inverted orientation where valves that rely upon gravity devices can't operate.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

DETAILED DESCRIPTION OF THE INVENTION

Figure 1:
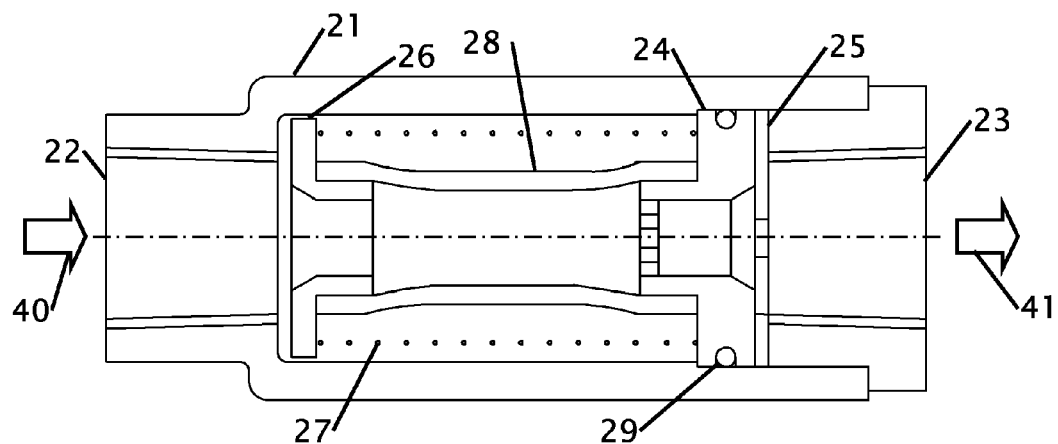
FIG. 1 shows a horizontal cross-sectional view showing the valve's components and assembly.

FIG. 1 shows a horizontal cross-sectional view showing the valve's components and assembly. In FIG. 1, the automatic over flow shutoff valve is installed between an inlet 40 and an outlet 41 of a water supply system. The over flow shutoff valve will respond to a flow that is higher than the pre-set flow threshold and subsequently shutoff the flow through the device. This threshold GPM is pre-set and imprint on the valve casing body. This device will automatically shutoff when the flow is higher than 120% of normal flow rate. In the preferred embodiment, the Overflow Shutoff device is designed to operate in the normal pressure range i.e. 40 psi to 120 psi.

The first preferred embodiment of the over flow shutoff valve is shown in FIG. 1 which consists of a casing body 21 and Venturi assembly 24 through 29. The casing body 21 houses the rubber tube assembly. The rubber Venturi tube assembly provides the sensing of flow rate and the shutoff functions. The casing has an inlet port 22 and an outlet port 23, and a flow chamber 21. The Venturi tube assembly consists of the rubber tube 28, the fixed flange 24, moveable flange 26, coil spring 27, o-ring 29 and surge flow suppressor orifice 25. The inlet and or outlet ports 22, 23 are configurable as threaded NPT type connections, slip fit, compression fitting or other similar connecting means.

The surge flow suppressor orifice 25 provides some regulation of the flow to minimize the effects of initial flow through the valve and abrupt change in flow from another valve opening/closing or a sprinkler opening. In the preferred embodiment the normal flow, which means subnormal the rated flow, the speed of fluid inside of rubber Venturi tube is not sufficient enough to create low pressure therefore Venturi tube will stay in normal operation position and water will not be interrupted.

The rubber Venturi tube material has been selected because it is one of the most resilient latex rubbers with high strength, high elongation rate and will spring back to original shape numerous instances. This gives the valve a long, lasting lifetime of usefulness and functionality.

Figure 2:
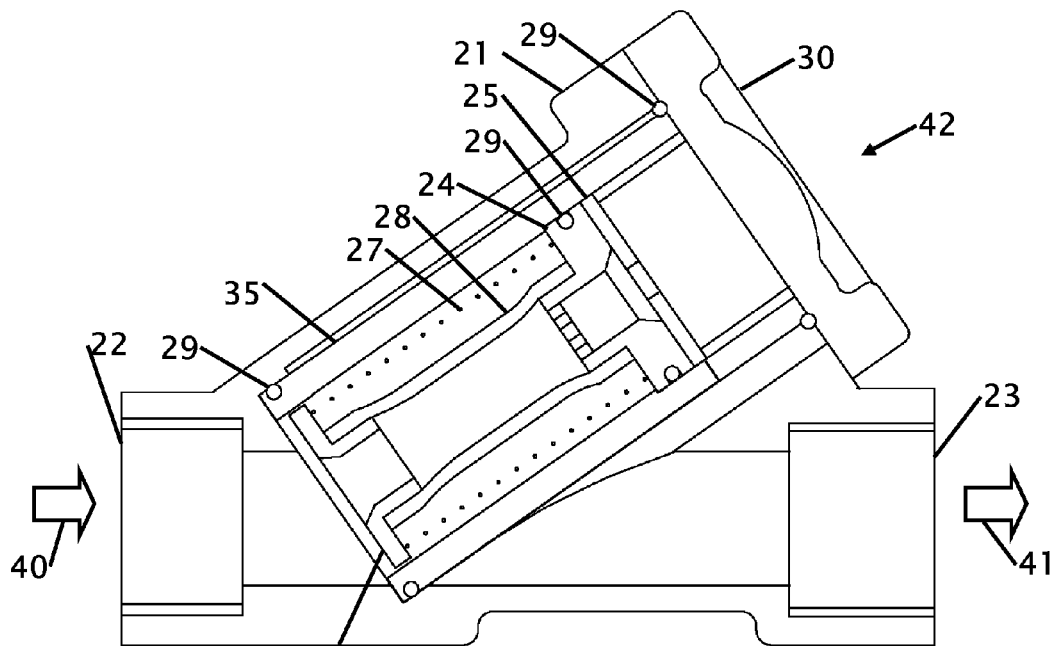
FIG. 2 shows a cross section view showing a Y shape shutoff valve body with an interchangeable cartridge for easy servicing.

FIG. 2 shows a cross section view showing a Y shape shutoff valve body with an interchangeable cartridge for easy servicing. The water enters the inlet 40, up the leg of the Y shape and then flows down the side port 42 where it flows out of the outlet port 42. The Y shape provides an end cap 30 that can be removed to check, change or service the Venturi assembly. A cartridge body 35 can be removed and or replaced to provide different flow shutoff rates, for examples including but not limited to 5 GMP, 10 GPM and 30 GPM, that would be available for different network flow rates and pipe diameters. It may be desirable to change the shutoff flow rate when the number or type of irrigation heads has been changed or the supply pressure is changed.

Figure 3:
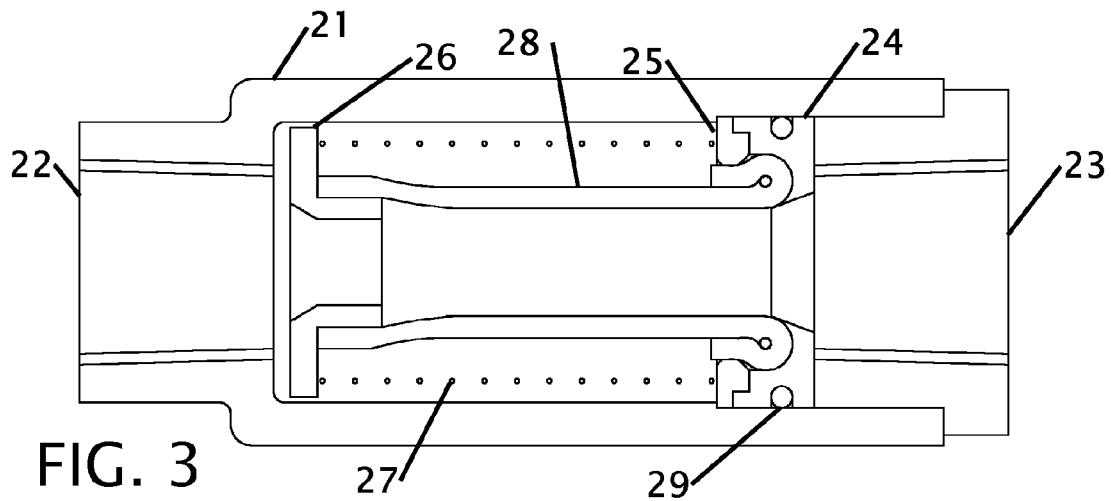
FIG. 3 shows a horizontal view of the valve with low or no flow through the valve.
Figure 4:
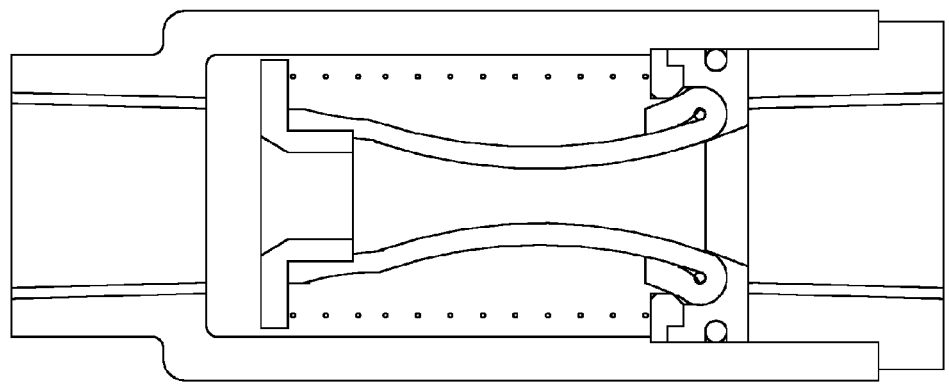
FIG. 4 shows a horizontal view of the valve with flow increasing.
Figure 5:
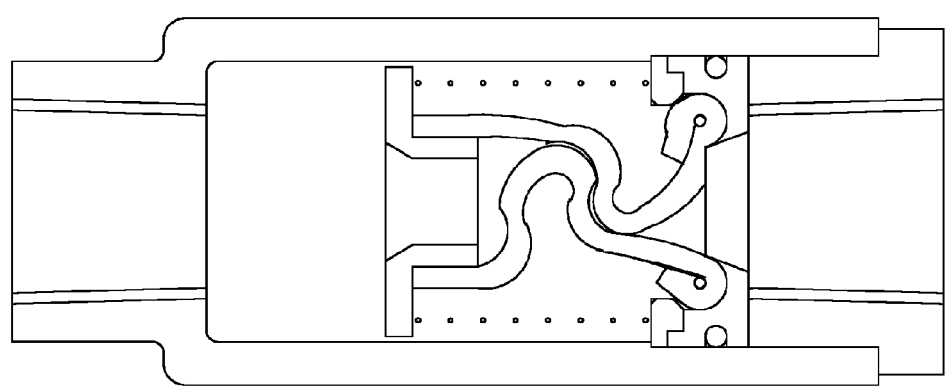
FIG. 5 shows a horizontal view of the valve where the overflow has closed the valve.

FIG. 3 shows a horizontal view of the valve with low or no flow through the valve, FIG. 4 shows a horizontal view of the valve with flow increasing, FIG. 5 shows a horizontal view of the valve where the overflow has closed the valve. In FIG. 3 the rubber tube is shown in its normal state. The coil spring 27 pushes against the ends of the rubber tube 28 to keep the rubber tube in its elongated condition. In FIG. 4 the flow through the rubber tube flows faster. The faster flow rate causes a lower pressure against the walls of the rubber tube 28. The lower pressure causes the rubber tube 28 to draw in and compresses the coil spring 27. In FIG. 5, the increased flow and friction of the flow against the inside of the rubber tube has drawn the rubber tube closed and collapses the rubber tube 28 thereby shutting off the flow through the Overflow Shutoff Valve.

In the event of above normal flow rate, 120% or higher than the rated flow, the speed of the fluid creates a low pressure within the rubber Venturi tube. According to the Bernoulli theorem, in the fluid dynamic, the speed of the fluid increases in the conduit and the pressure will decrease.

The over flow shutoff valve rubber Venturi tube will be reset automatically by the coil spring and spring back the force of rubber Venturi tube when water pressure is closed and dropped to below 5 psi. The coil spring 27 will pull against the ends of the rubber tube and open the rubber tube to allow full flow through the Venturi.

One unique and advance feature of this design is the using the rubber Venturi tube assembly which has two functions. First, sensing the rate of flow and secondly, shutting off the flow. This simple, single rubber tube assembly is free to move inside the casing chamber.

Figure 6:
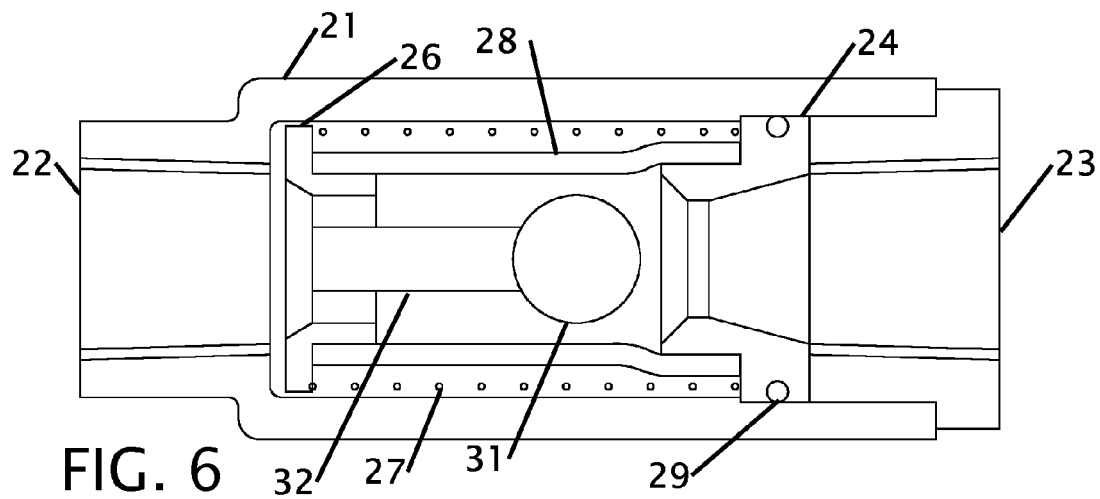
FIG. 6 shows a horizontal view of a second preferred embodiment of the valve with low or no flow through the valve.
Figure 7:
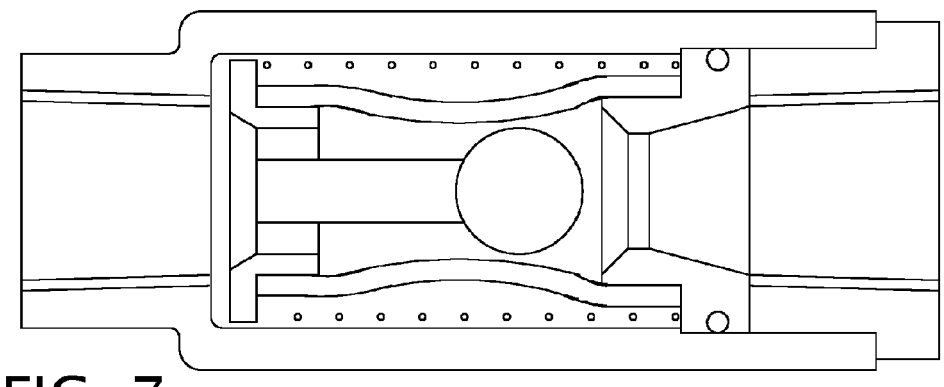
FIG. 7 shows a horizontal view of a second preferred embodiment of the valve with flow increasing.
Figure 8:
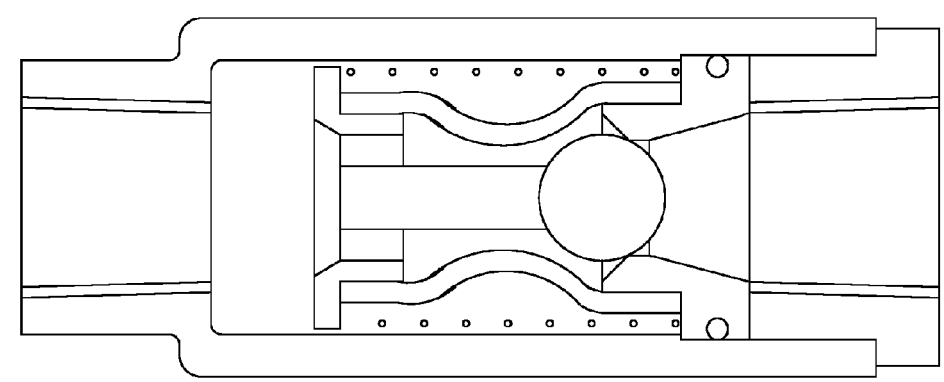
FIG. 8 shows a horizontal view of a second preferred embodiment of the valve where the overflow has closed.

FIG. 6 shows a horizontal view of a second preferred embodiment of the valve with low or no flow through the valve, FIG. 7 shows a horizontal view of a second preferred embodiment of the valve with flow increasing, FIG. 8 shows a horizontal view of a second preferred embodiment of the valve where the overflow has closed. In this second embodiment the orifice is created by a bulbous 31 element on the end of a post 32. The operation is similar to what is shown and disclosed in FIGS. 3-5. As the flow increases from FIG. 6 to 8 the higher flow rate causes the rubber tube to collapse and the movable flange 26 compressed the coil spring 27 until the rubber tube makes contact with the bulbous orifice to shutoff flow through the Venturi as shown in FIG. 8.

Figure 9:
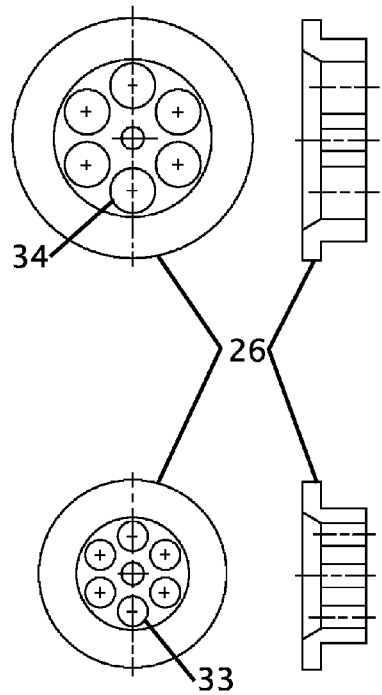
FIG. 9 shows the various components that are used in the second preferred embodiment.
Figure 9:
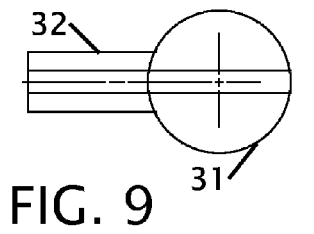
Figure 9:
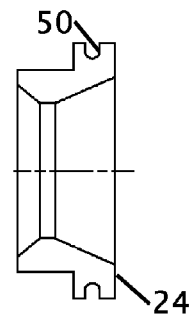
Figure 10:
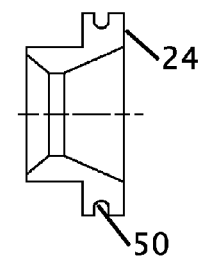
FIG. 10 shows similar components from FIG. 9 but with a different shutoff flow rate.

FIG. 9 shows the various components that are used in the second preferred embodiment; FIG. 10 shows similar components from FIG. 9 but with a different shutoff flow rate. The movable flange 26 in FIG. 9 has a smaller series of holes 33 than the holes 34 in the movable flange 26 in FIG. 10. The holes 33 and 34 provide flow regulation to limit initial flow through the Venturi. The post 32 and bulbous orifice 31 in FIGS. 9 and 10 each provide different amount of flow before shutoff. By changing the diameter of the bulbous orifice 31 the shutoff flow rate is defined. The fixed flanges 24 in these figures are shown with the O-ring cavity 50.

Figure 11:
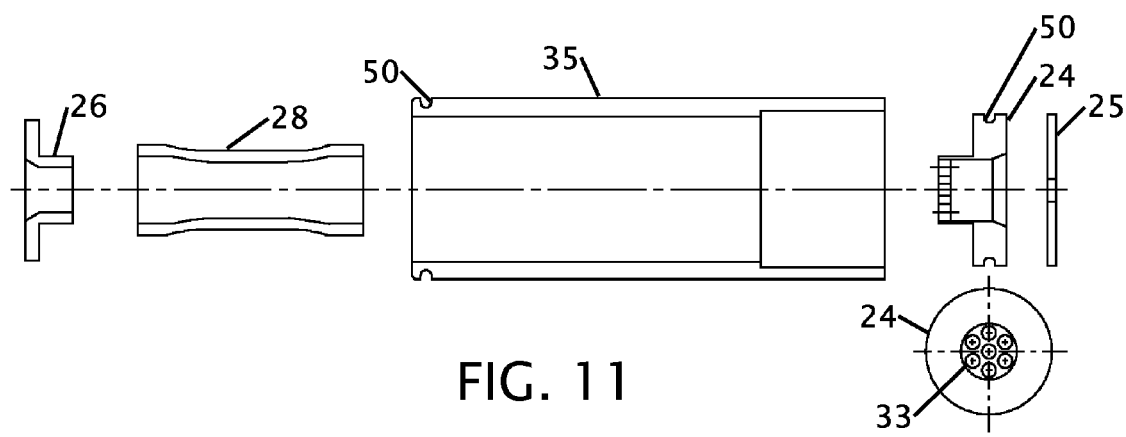
FIG. 11 shows the internal components from the interchangeable Overflow Shutoff Valve cartridge.
Figure 11:
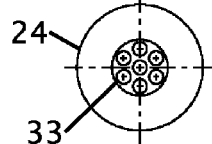

FIG. 11 shows the internal components from the interchangeable Overflow Shutoff Valve cartridge. This figure shows an exploded diagram of the internal components for the changeable cartridge. The movable flange 26 is inserted into the rubber tube 28. These two pieces along with the coil spring (not shown) are inserted into the cartridge body 35. The fixed flange 24 and an orifice plate 25 are inserted into the opposing end of the cartridge body 35. Below the movable flange a top view of the fixed flange is shown with a plurality of through holes 33. An O-ring cavity 50 is shown in the fixed flange 24 and the cartridge body 35.

Thus, specific embodiments of an Overflow Shutoff Valve have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. An Overflow Shutoff Valve comprising;
a valve casing body including an inlet port and outlet port with a standard threaded and or slip fit connection on both said inlet port and said outlet port;
a movable rubber Venturi tube and shutoff assembly with fixed and moving flange, a surge flow suppressor orifice on a separate surge flow suppressor orifice plate, an o-ring seal and a suspension coil spring within said valve casing body;
wherein said moving flange has a flow cross-sectional that is smaller than a flow cross-sectional of said movable rubber Verturi tube when said movable rubber Venturi tube is in an extended condition;
wherein fluid pressure acting solely against an outer surface of said moving flange pushes against said coil spring to collapse said movable rubber Venturi tube;
a different size of Venturi tube assembly is determined by the rate of flow, and
said separate surge flow suppressor orifice plate is separate from said moving flange and prevents any unwanted shutoff caused by surge flow.

2. The Overflow Shutoff Valve according to claim 1 wherein as the speed of flow through said Venturi increases inside of said Venturi tube the pressure will decrease.

3. The Overflow Shutoff Valve according to claim 1 wherein said rubber Venturi tube shuts off said flow when said flow is above 120% of a rated flow.

4. The Overflow Shutoff Valve according to claim 1 wherein when excessive flow passes through said Venturi tube assembly, said excessive flow pushes on said movable flange to overcome said suspension coil spring and at least partially collapses said movable rubber Venturi within said valve casing body.

5. The Overflow Shutoff Valve according to claim 1 wherein said rubber Venturi tube is a resilient latex rubber material.

6. The Overflow Shutoff Valve according to claim 5 wherein said surge flow suppressor orifice operates to prevent flow shut off from initial flow and or a flow surge.

7. The Overflow Shutoff Valve according to claim 1 wherein said movable rubber Venturi tube assembly automatically reset when a back pressure drops to below 5 psi.

8. The Overflow Shutoff Valve according to claim 7 wherein said Overflow Shutoff Valve is a standalone device and is usable in combination with other devices.

9. The Overflow Shutoff Valve according to claim 7 wherein said movable rubber Venturi tube at least partially collapses to stop flow through said movable rubber Venturi tube.

10. An Overflow Shutoff Valve comprising;
a Y body valve casing body that including an inlet port an angled leg and outlet port with a standard threaded and or slip fit connection on both said inlet port and said outlet port;
a movable rubber Venturi tube and shut off assembly with fixed and moving flange, a surge flow suppressor orifice on a separate surge flow suppressor orifice plate, an o-ring seal and a suspension coil spring within said Y body valve casing body;
said angled leg further provides a servicing cap for access to said movable rubber Venturi and said shut off assembly;
said moving flange has a flow cross-sectional that is larger than a flow cross-sectional of said movable rubber Verturi tube when said movable rubber Venturi tube is in an extended condition;
wherein fluid pressure acting solely against an outer surface of said moving flange pushes against said coil spring to collapse said movable rubber Venturi tube;
a different size of Venturi tube assembly is determined by the rate of flow, and
said separate surge flow suppressor orifice plate is separate from said moving flange and prevents any unwanted shut off caused by surge flow.

11. The Overflow Shutoff Valve according to claim 10 wherein as the speed of flow through said Venturi increases inside of said Venturi tube the pressure will decrease.

12. The Overflow Shutoff Valve according to claim 10 wherein said rubber Venturi tube shuts off said flow when said flow is above 120% of a rated flow.

13. The Overflow Shutoff Valve according to claim 10 wherein when excessive flow passes through said Venturi tube assembly, said excessive flow pushes on said movable flange to overcome said suspension coil spring and at least partially collapses said movable rubber Venturi within said Y body valve casing body.

14. The Overflow Shutoff Valve according to claim 10 wherein said rubber Venturi tube is a resilient latex rubber material.

15. The Overflow Shutoff Valve according to claim 14 wherein said surge flow suppressor orifice operates to prevent flow shut off from initial flow and or a flow surge.

16. The Overflow Shutoff Valve according to claim 10 wherein said movable rubber Venturi tube assembly automatically reset when a back pressure drops to below 5 psi.

17. The Overflow Shutoff Valve according to claim 16 wherein said Overflow Shutoff Valve is a standalone device and is usable in combination with other devices.

18. The Overflow Shutoff Valve according to claim 16 wherein said movable rubber Venturi tube at least partially collapses to stop flow through said movable rubber Venturi tube.

* * * * *